United States Patent [19]

Metroka et al.

[11] Patent Number: 5,249,302
[45] Date of Patent: Sep. 28, 1993

[54] MIXED-MODE TRANSCEIVER SYSTEM

[75] Inventors: Michael P. Metroka, Algonquin; Joshua P. Kiem, Park Ridge, both of Ill.

[73] Assignee: Motorola, Inc., Schaumburg, Ill.

[21] Appl. No.: 653,835

[22] Filed: Feb. 11, 1991

Related U.S. Application Data

[63] Continuation-in-part of Ser. No. 107,227, Oct. 9, 1987, Pat. No. 5,029,233.

[51] Int. Cl.⁵ .......................... H04B 7/15; H04B 1/38; H04B 1/40
[52] U.S. Cl. .................. 455/11.1; 455/54.1; 455/74; 455/89; 455/93; 375/5; 379/59
[58] Field of Search ............... 455/11.1, 15, 17, 33.1, 455/33.2, 33.3, 34.1, 54.1, 54.2, 22, 56.1, 88, 89, 90, 93, 186.1, 74, 78, 101, 102, 103; 379/58, 59, 60, 63; 307/350; 375/5, 7, 56, 110; 370/11

[56] References Cited

U.S. PATENT DOCUMENTS

| | | | |
|---|---|---|---|
| 4,369,516 | 1/1983 | Byrns | 375/110 |
| 4,593,155 | 1/1986 | Hawkins | 455/88 |
| 4,654,655 | 3/1987 | Kowalski | 455/78 |
| 4,798,975 | 1/1989 | Walczak et al. | 307/350 |
| 4,878,238 | 10/1989 | Rash et al. | 379/58 |
| 4,894,856 | 1/1990 | Nakanishi et al. | 379/58 |
| 4,972,432 | 11/1990 | Wilson et al. | 455/78 |
| 4,989,230 | 1/1991 | Gillig et al. | 379/59 |
| 5,020,076 | 5/1991 | Cahill et al. | 375/56 |
| 5,020,092 | 5/1991 | Phillips et al. | 379/59 |
| 5,029,233 | 7/1991 | Metroka | 455/33.1 |
| 5,054,115 | 10/1991 | Sawa et al. | 455/89 |
| 5,127,042 | 6/1992 | Gillig et al. | 455/33.1 |

FOREIGN PATENT DOCUMENTS

0378450  7/1990  European Pat. Off. ......... 455/89

Primary Examiner—Reinhard J. Eisenzopf
Assistant Examiner—Lisa Charouel
Attorney, Agent, or Firm—Robert H. Kelly

[57] ABSTRACT

A radiotelephone system comprised of a radiotelephone-pair suitably intercoupled theretogether to permit transfer of data, such as NAM information, therebetween. A first of the radiotelephone-pair comprises a radiotelephone of conventional construction. A second radiotelephone of the radiotelephone-pair comprises a radiotelephone having circuitry to transmit efficiently an information signal upon a cellular, communication system of increased capacity. The data sequence contained in the first radiotelephone is transferred to the second radiotelephone to permit a communication link to be formed between the second radiotelephone and a cellular, communication network.

21 Claims, 5 Drawing Sheets

MIXED-MODE TRANSCEIVER SYSTEM

CROSS-REFERENCE TO RELATED APPLICATIONS

The present application is a continuation-in-part of application Ser. No. 107,227, filed Oct. 9, 1987, and now U.S. Pat. No. 5,029,233, issued Jul. 2, 1991.

BACKGROUND OF THE INVENTION

The present invention relates generally to wireless communication systems, and, more particularly, to a mixed-mode transceiver system for a radiotelephone-pair which permits generation of a communication link with a fixed station of the communication system by the transmission of a code contained in either one of the radiotelephones comprising the radiotelephone-pair.

A communication system which transmits information between two locations includes, at a minimum, a transmitter and a receiver interconnected by a transmission channel. Communication between the transmitter and the receiver is effectuated by transmission of the information, in the form of an information signal, upon the transmission channel.

In one type of communication system, a radio communication system, the transmission channel is comprised of a radio-frequency channel which interconnects the transmitter and the receiver. To transmit an information signal (sometimes referred to as a baseband signal) upon the radio-frequency channel, the information signal must be converted into a form suitable for transmission thereof upon the radio-frequency channel.

Conversion of the information signal (i.e., the baseband signal) into a signal suitable for transmission upon the radio-frequency channel is accomplished by a process referred to as modulation wherein the information signal is impressed upon a radio-frequency electromagnetic wave. The radio-frequency electromagnetic wave is of a frequency of a value within a range of values of frequencies which defines the radio-frequency channel. The radio-frequency electromagnetic wave is commonly referred to as a carrier signal, and the radio-frequency electromagnetic wave, once modulated by the information signal, is referred to as a modulated, information signal.

The information content of the resultant, modulated, information signal occupies a range of frequencies, centered at, or close to, the frequency of the carrier signal. Because the modulated, information signal may be transmitted through free-space upon the radio-frequency channel to transmit thereby the information content of the information signal between the transmitter and the receiver of the communication system, the transmitter and the receiver need not be positioned in close proximity with one another.

Various modulation techniques have been developed to modulate the information signal upon the carrier signal to transmit thereby the information signal upon the radio-frequency transmission channel. Such modulation techniques include, but not by way of limitation: amplitude modulation (AM), frequency modulation (FM), and phase modulation (PM).

The receiver of the communication system which receives the modulated, information signal transmitted upon the transmission channel contains circuitry to detect, or to recreate otherwise, the information signal. Typically, the circuitry of the receiver includes circuitry (sometimes consisting of several stages) to convert downward in frequency the received, modulated, information signal. The process of detecting, or recreating, the information signal is referred to as demodulation, and such circuitry for performing demodulation is referred to as demodulation circuitry.

A plurality of modulated, information signals may be simultaneously transmitted as long as the simultaneously-transmitted, modulated, information signals are comprised of carrier signals of dissimilar frequencies, and the resultant, modulated, information signals do not overlap in frequency.

A receiver includes tuning and other filter circuitry to pass only certain of the signals received by the receiver. Such tuning and other filter circuitry form frequency passbands for passing signals, or component portions of signals, having frequencies within the passbands of such circuitry.

The broad range of frequencies of which the carrier signal may be comprised, and upon which the information signal may be modulated, is referred to as the electromagnetic frequency spectrum. Regulatory bodies have divided the electromagnetic frequency spectrum into frequency bands; the frequency bands may be further divided into frequency channels, such channels may, for example, form the transmission channels, as above-described, of a communication system. Regulation of the transmission of radio-frequency signals in certain of the frequency bands of the electromagnetic frequency spectrum minimize interference between simultaneously-transmitted, modulated, information signals.

Portions of a 100 MHz frequency band extending between 800 MHz and 900 MHz are allocated in the United States for radiotelephone communication. Radiotelephone communication, may, for example, be effectuated by a radiotelephone (or other transceiver) utilized in a cellular, communication system. A radiotelephone is operative both to transmit and to receive radio-frequency, modulated, information signals. Two-way communication is permitted between the radiotelephone and a remotely-located transceiver.

In general, a cellular, communication system is comprised of a fixed communication network which transmits modulated, information signals to, and receives modulated, information signals from, radiotelephones. The fixed, communication network is created by positioning numerous base stations at spaced-apart locations throughout a geographical area. A base station forms a fixed site which contains circuitry to receive modulated, information signals transmitted by one, or many, radiotelephones, and to transmit modulated, information signals to the one, or many, radiotelephones. Because both the fixed site formed of the base station and a radiotelephone permits both transmission and reception of modulated, information signals, two-way communication between a radiotelephone and a base station is permitted. The base stations are connected to a conventional, wireline telephone system through switching centers.

The position at which each of the base stations of the cellular, communication system is located is carefully selected so that at least one base station is within the reception range of a radiotelephone positioned at any location throughout the geographical area. Because of the spaced-apart nature of the positioning of the base stations, portions of the geographical area throughout which the base stations are located are associated with individual ones of the base stations. Portions of the geographical area positioned proximate to each of the spaced-apart base stations define "cells" wherein a plurality of cells, each associated with a base station, together form the geographical area encompassed by the cellular, communication system. A radiotelephone positioned within the boundaries of any of the cells of the cellular, communication system may transmit, and receive, modulated, information signals to, and from, at least one base station.

Radiotelephones utilized in such a cellular, communication system are of many varied constructions. One construction of radiotelephone, referred to generically as a mobile radiotelephone, is affixed in position in a vehicle, such as an automobile. Affixation of the mobile radiotelephone in the vehicle is advantageous for the reason that the power required for operation of the mobile radiotelephone may be supplied by the vehicular power supply. Therefore, the mobile radiotelephone may be operated at relatively high power levels to increase the transmission range, and reception range, of modulated, information signals transmitted by the mobile radiotelephone. However, because the mobile radiotelephone is affixed in position within the vehicle, portability of the mobile radiotelephone is minimal in some constructions, and in other constructions, although permitting of removal from the vehicle, the portability of the radiotelephone is limited due to the generally large physical size of the mobile radiotelephone. Further, because the mobile radiotelephone is powered by the vehicular power supply when affixed to the vehicle, subsequent to removal of the mobile radiotelephone from the vehicle, an alternate source of power is required to permit operation of the mobile radiotelephone.

Portable radiotelephones are of constructions to permit convenient carriage by a user. To permit such portability, a portable power supply (e.g., a battery pack) is affixed to the portable radiotelephone to power the portable radiotelephone thereby. Because the portable power supply stores only a finite amount of energy, the time period during which the portable radiotelephone may be powered is limited. Once the stored energy of a portable power supply is depleted beneath a minimum level, the supply must be replaced with another portable power supply to permit continued operation of the portable radiotelephone.

To increase the length of time during which the portable radiotelephone may be powered by a single portable power supply, attempts are made to minimize the power level at which the portable radiotelephone is operated, and generally, the maximum power level at which the portable radiotelephone may be operated is less than the maximum power level at which the mobile radiotelephone may be operated. The maximum transmission and reception range of a portable radiotelephone is, therefore, generally less than the maximum transmission and reception range of a mobile radiotelephone.

It may be discerned that radiotelephones are constructed to optimize certain design parameters. Optimization of certain of the design parameters prevents optimization of other of the design parameters. For instance, a portable radiotelephone design optimizes the physical dimensions thereof to increase thereby the portability of the device. The maximum output power of such a portable radiotelephone cannot be optimized, as the size of the power supply would be too large. Conversely, a mobile radiotelephone may be constructed to maximize operational power output levels as a mobile radiotelephone generally need not optimize size parameters.

In the past, therefore, careful consideration of the intended use of the radiotelephone was required to ensure that the radiotelephone was of a construction which optimized desired ones of the design parameters.

The need of a user alternately to utilize a mobile radiotelephone in which certain ones of the design parameters are optimized, and a portable radiotelephone in which other ones of the design parameters are optimized in some instances requires the user to purchase both a mobile radiotelephone and a portable radiotelephone. In the past, when a user required both a mobile radiotelephone and a portable radiotelephone, payment of an access fee was required to provide each of the radiotelephones with distinct access codes to permit each of the radiotelephones to access the communication network (i.e., the fixed sites comprised of the spaced-apart base stations) of the cellular, communication system. Even when simultaneous use of the two telephones was not anticipated or desired, the user was required to obtain such access codes for each radiotelephone.

Disclosed in U.S. Pat. No. 5,029,233, of which this application is a continuation-in-part by Michael P. Metroka, co-inventor of the present invention, is a radio arrangement in which two separate radiotelephones are intercoupled such that an access code, required to form the communication link with the communication network, contained in one of the radiotelephones may be transferred to the other of the radiotelephones to permit the other of the radiotelephones to form a communication link with the communication network. Such an arrangement is advantageous as a user is required to obtain only one access code, and, hence, pay only one access fee, but is still able to utilize both of the radiotelephones.

As an example, a user having both a mobile radiotelephone and a portable radiotelephone may pay an access fee to provide the portable radiotelephone with an access code to permit thereby the portable radiotelephone to form a communication link with the communication network. By intercoupling the portable radiotelephone containing the access code with the mobile radiotelephone, the access code contained in the portable radiotelephone may be transferred to the mobile radiotelephone. The access code transferred to the mobile radiotelephone may be utilized by the mobile radiotelephone to form a communication link with the communication network. One such radiotelephone arrangement is the 9800XL extended system sold by Motorola, Inc. The access code contained in one of the radiotelephones is conventionally contained (but not by of necessity) in the portable radiotelephone as, once the user exits the vehicle in which the mobile radiotelephone is affixed, the portable radiotelephone may be carried by the user and then thereafter be utilized to form a communication link with the communication network to communicate therethrough.

Increased usage of cellular, communication systems has resulted, in many instances, in the full utilization of every available transmission channel of the frequency band allocated for cellular, radiotelephone communication. As a result, various ideas have been proposed to utilize more efficiently the frequency band allocated for radiotelephone communications. More efficient utilization of the frequency band allocated for radiotelephone communication increases the transmission capacity of a cellular, communication system.

One such manner by which the transmission capacity of the cellular, communication system may be increased is to utilize a digital, or other discrete, modulation technique. When an information signal is converted into discrete form, a single transmission channel may be utilized to transmit, sequentially, more than one signal. Because more than one information signal may be transmitted upon a single transmission channel, the transmission capacity of an existing frequency band may be increased by a multiple of two or more.

Another such manner by which the transmission capacity of the cellular, communication system may be increased is to reduce the bandwidth of each transmission channel upon which the modulated, information signal is transmitted. Such a reduction in the bandwidth allocated for each transmission channel, of course, requires the bandwidth of the modulated, information signal to be commensurately reduced. For example, by reducing the bandwidth of each of the transmission channels of the allocated frequency band by a factor of two, the transmission capacity of an existing frequency band may be increased by a multiple of two. Reduction in the bandwidth of the transmission channels by other multiples, of course, results in a similar, corresponding increase in transmission capacity.

Adoption of any of the above-mentioned ideas for increasing transmission capacity of an existing, cellular system would require use of a radiotelephone construction capable of generating modulated, information signals which may be transmitted upon such a system of increased capacity. For instance, utilization of a digital, or other discrete, modulation technique would require a radiotelephone capable of forming a discretely-encoded, modulated, information signal. Similarly, utilization of a reduced-bandwidth, modulation technique would require a radiotelephone capable of forming a modulated, information signal of the reduced bandwidth.

The great majority of existing radiotelephones are of constructions which permit transmission of modulated, information signals upon existing cellular, communication systems. Such existing radiotelephones do not generate modulated, information signals capable of generating the signals, as above-described, required to utilize advantageously proposed, cellular communication systems of increased capacity. Therefore, to obtain benefit of the increased capacity of proposed, cellular, communication systems, purchase of radiotelephones of new design would be required.

To permit continued use of existing radiotelephone constructions, systems proposed to implement any of the above-mentioned ideas permit both use of radiotelephone constructions of existing design as well as radiotelephone constructions of designs permitting advantageous utilization of the systems of increased capacity. Radiotelephone constructions of existing design are still, and would remain, quite functional and operable in such systems of increased capacity. Additionally, in many instances, the transmission channels of the frequency band allocated for cellular, radiotelephone communication are fully utilized during only certain periods of the day (for example, during morning and evening rush hour time periods). Further, only certain, cellular systems, generally those located at, or close to, certain urban centers, have reached such full utilization of the existing frequency band. In short, even with the introduction of such systems of increased capacity, radiotelephone constructions of existing design will still be quite useful.

Therefore, because radiotelephones of existing construction may be utilized even subsequent to implementation of cellular systems of increased capacity, utilization of such radiotelephones of existing design will certainly continue. However, such continued use of radiotelephone constructions of existing design would not permit advantageous utilization of the additional transmission capacity of a cellular, communication system of increased capacity. What is needed, therefore, is a system which permits a radiotelephone construction of existing design to utilize the features of a cellular, communication system of increased capacity at minimal cost.

SUMMARY OF THE INVENTION

The present invention advantageously provides a system for upgrading a radiotelephone of existing construction.

The present invention further advantageously provides a mixed-mode transceiver system having at least two transceivers intercoupled theretogether of which one of the transceivers may be comprised of a radiotelephone construction of conventional design, and a second of the transceivers may be comprised of a radiotelephone construction of a design capable of advantageously utilizing the additional transmission capacity of a cellular, communication system of increased capacity.

The present invention still further advantageously provides a method for transmitting information signals in either of at least a first transmission mode, or a second transmission mode to a communication network.

In accordance with the present invention, therefore, a mixed-mode transceiver system operable on a communication network having at least one fixed site capable of receiving and transmitting information signals of at least first and second transmission modes is disclosed. The transceiver system is comprised of at least two transceivers wherein a first transceiver of the at least two transceivers is operable to transmit information signals in the first transmission mode and a second transceiver of the at least two transceivers is operable to transmit information signals in the second transmission mode. At least one of the first and second transceivers contains a code which, when transmitted to a fixed site of the communication network, causes a communication link to be created therewith. The first transceiver and the second transceiver are intercoupled to transfer the code provided to the communication network from the first transceiver to the second transceiver when the code is contained in the first transceiver to transmit the code in the second transmission mode. The code is transferred from the second transceiver to the first transceiver when the code is contained in the second transceiver to transmit the code in the first transmission mode.

BRIEF DESCRIPTION OF THE DRAWINGS

The present invention will be better understood when read in light of the accompanying drawings in which.

DESCRIPTION OF THE PREFERRED EMBODIMENT

Figure 1:
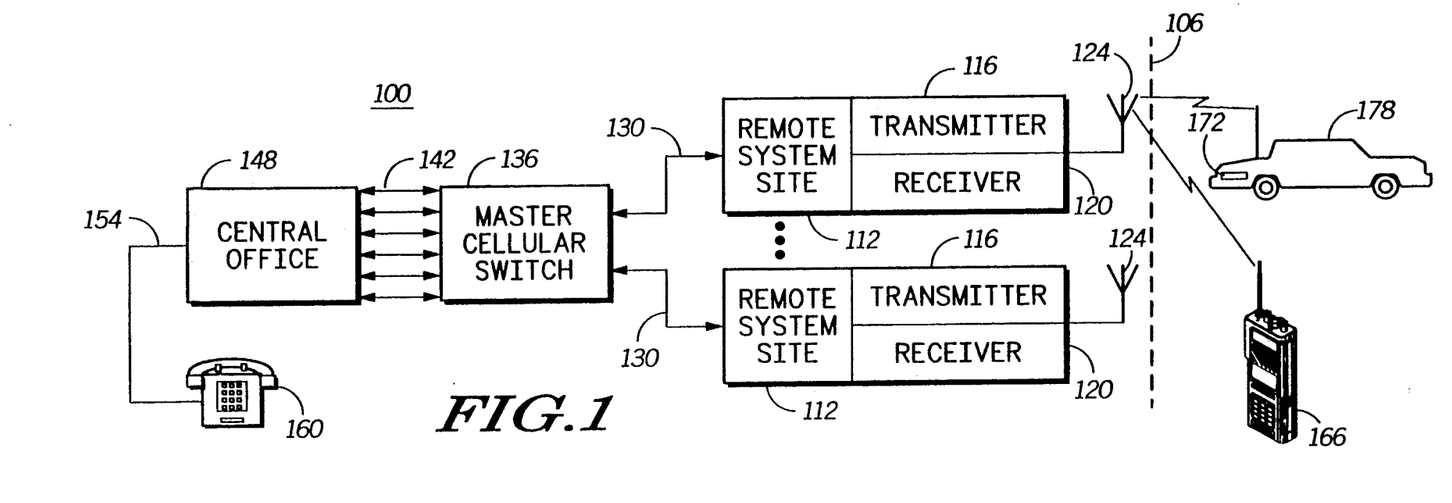
FIG. 1 is a partial block, partial schematic diagram of a cellular, communication system illustrating the positioning of a mobile radiotelephone and a portable radiotelephone proximate to a fixed site comprising a base station.

Referring first to the partial block, partial schematic illustration of FIG. 1, the elements of a cellular communication system are shown. As described previously, the cellular, communication system is formed of a plurality of fixed-sites comprising base stations which are positioned at spaced-apart locations throughout a geographical area. The plurality of base stations together comprise a portion of a fixed, communication network, referred to generally by reference numeral 100, comprising elements at the left-hand side portion of the figure as defined by line 106, shown in hatch. A plurality of fixed-sites forming base stations 112 are positioned at spaced-apart locations throughout a geographical area. While two of such base stations 112 are illustrated in FIG. 1, it is to be understood that the system of the present invention is operative to communicate with a single base station 112 formed of a fixed-site, or, typically, a large number of base stations 112. As indicated in the figure, each base station 112 comprises a transmitter portion 116, receiver portion 120, and antenna 124. Each base station 112 is connected by a hard-line connection, indicated by lines 130, to a switching center; such switching center is referred to in a cellular, communication system as a master cellular switch center (MCSC), indicated by the figure by block 136. MCSC 136 is, in turn, connected by hard-line connections, indicated by lines 142, to a conventional telephone network, as represented by central office block 148. The conventional telephone network further comprises hard-line connections, such as indicated by line 154, to conventional, wireline telephones, such as telephone 160.

A radiotelephone, such as portable radiotelephone 166 or mobile radiotelephone 172 affixed within automobile 178 may transmit modulated, information signals to the receiver portions 120 of a base station 112 when positioned proximate thereto, and may similarly receive modulated, information signals transmitted by a transmitter portion 116 of a base station 112. A modulated, information signal transmitted by one of the radiotelephones, such as portable radiotelephone 166, once received by a base station 112 may be routed through the communication network 100 to, for example, wireline telephone 160, or another radiotelephone, such as mobile radiotelephone 172 affixed within automobile 178.

Figure 2:
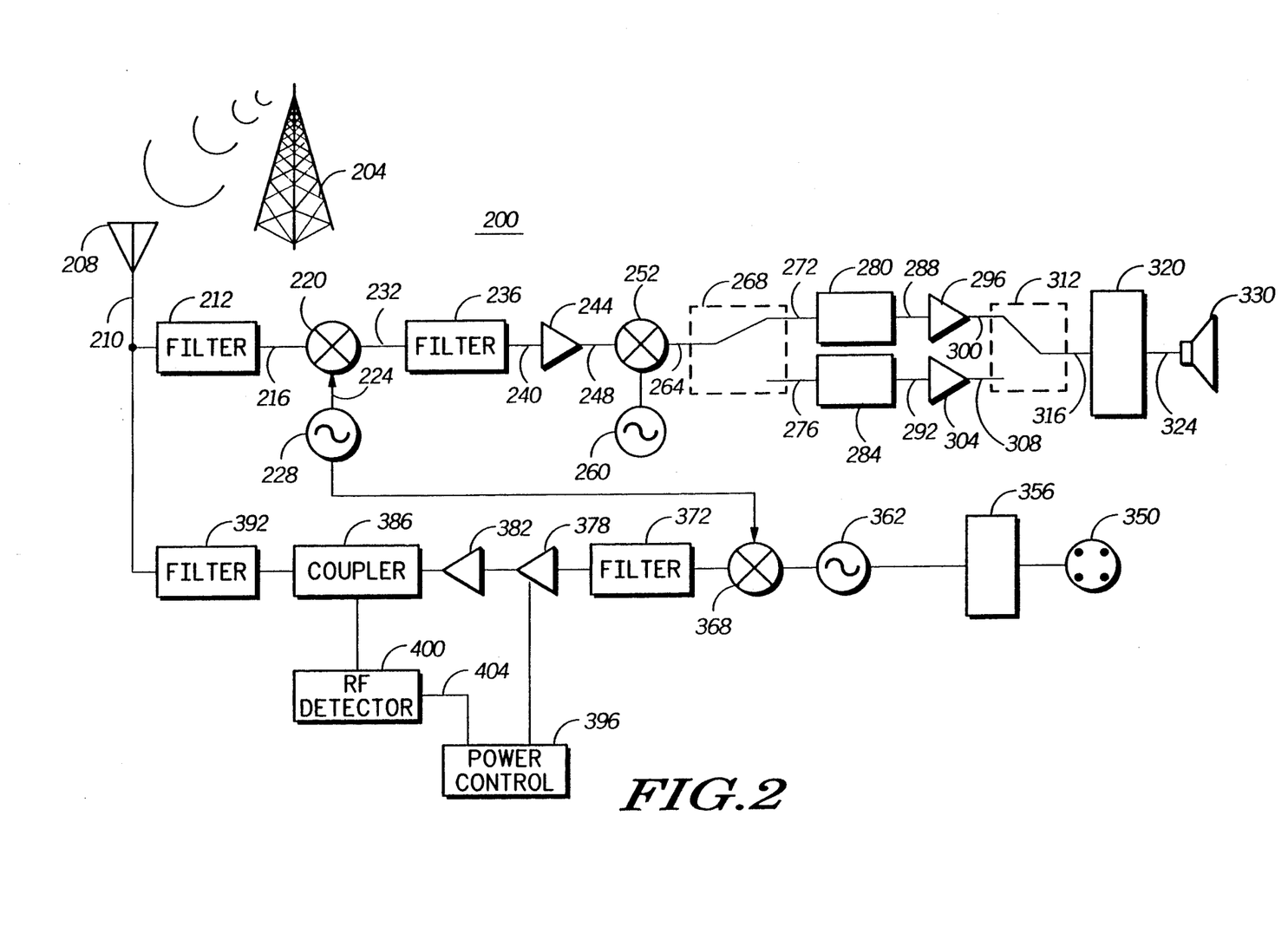
FIG. 2 is a block diagram of a radiotelephone of which either the mobile radiotelephone or the portable radiotelephone of FIG. 1 may be comprised.

Turning now to the block diagram of FIG. 2, a transceiver (here, more particularly, a radiotelephone), referred to generally by reference numeral 200, of which a radiotelephone, such as portable radiotelephone 166 or mobile radiotelephone 172 of FIG. 1 may be comprised is shown. More particularly, transceiver 200 is of a construction permitting reception and transmission of signals upon either a cellular, communication system of conventional bandwidth or of reduced bandwidth, and is illustrated for purposes of example only. Such a transceiver is referred to as being of a "dual-mode" construction. Other transceiver constructions may, of course, be used in the system of the present invention. For instance, a transceiver construction operative to receive and to generate discretely-encoded signals comprise many of the elements of transceiver 200 of FIG. 2. Modulation and demodulation circuitry would, however, differ corresponding to the modulation-type (i.e., transmission mode) of the signal to be transmitted and received by the transceiver. The actual circuitry embodying the functional blocks of the diagram may be disposed upon one or more circuit boards and housed within a conventional radiotelephone housing.

A signal transmitted by a base station, such as a base station 112 of FIG. 1, and represented in FIG. 2 by transmitter 204, is received by a radiotelephone antenna 208. Antenna 208 supplies the received signal on line 210 to filter 212. Filter 212 is preferably a very wideband filter having a passband to pass signal portions of a received signal within a desired frequency range. Filter 212 generates a filtered signal on line 216 which is supplied to mixer 220. Mixer 220 additionally receives an oscillating signal on line 224 generated by oscillator 228. Oscillator 228 preferably forms a portion of a conventional phase locked loop (not shown) having a frequency of oscillation controlled by a reference oscillator (not shown) and a frequency divider, such as a programmable synthesizer (also not shown). Mixer 220 generates a down-converted signal (commonly referred to as a first intermediate frequency, i.e., IF, signal) on line 232. The down-converted signal generated on line 232 is supplied to filter 236. Filter 236 is preferably a bandpass filter, such as a monolithic crystal wideband filter, and is commonly referred to as the first intermediate frequency, i.e., IF, filter.

Filter 236 generates a filtered signal on line 240 which is supplied to amplifier 244. Amplifier 244 generates an amplified signal on line 248 which is supplied to second mixer 252. Line 256 is also coupled to mixer 252 to supply an oscillating signal generated by oscillator 260 thereto. Similar to oscillator 228, the oscillation frequency of oscillator 260 is locked into a known frequency relationship with a reference oscillator (not shown).

Mixer 252 generates a mixed signal on line 264 which is supplied to switching circuit 268. Switching circuit 268 may, for example, be comprised of an integrated circuit switch. Switching circuit 268 alternately connects line 264 to lines 272 or 276. Line 272 is coupled to filter 280 of a first bandwidth, and line 276 is coupled to filter 284 of a second bandwidth. the mixed signal generated by mixer 252 on line 264 is filtered by either filter 280 or filter 284 responsive to positioning of the switch of switching circuit 268. When the switch of switching circuit 268 connects line 264 and 272, a filtered signal is generated by filter 280 on line 288. When the switch of switching circuit 268 is positioned to connect lines 264 and 276, filter 284 generates a filtered signal on line 292.

Line 288 is coupled to amplifier/limiter 296 which generates an amplified signal on line 300 when a filtered signal is supplied to amplifier/limiter 296 on line 288. Similarly, line 292 is coupled to amplifier/limiter 304 which generates an amplified signal line 308 when a filtered signal is supplied to the amplifier/limiter 304 on line 292. Lines 300 and 308 are coupled to switching circuit 312 which, similar to switching circuit 268 is preferably comprised of an integrated circuit switch. Switching circuit 312 operates in the manner similar to switching circuit 268 alternately to connect line 300 or 308 to line 316. Line 316 is coupled to demodulator circuit 320 which demodulates the signal supplied thereto and generates a demodulated signal on line 324 which is supplied to the transducer, such as speaker 330.

In a transceiver construction which is of a conventional design, switching circuits 268 and 312 are not required as line 264 is directly connected to filter 280 and amplifier/limiter 296 is directly connected to demodulator circuit 320, and the parallel filter-amplifier/limiter 284-304 line is not utilized.

The bottom portion of the block diagram of FIG. 2 further illustrates a transmit portion of the radiotelephone 200. As the transmit portion is conventional in nature (except for the modulator portion thereof which is of a construction particular to the type of modulated, information signal to be transmitted by the radiotelephone, i.e., the desired transmission mode in which the radiotelephone is to be operated), a detailed description of operation thereof is omitted, but review of the figure shows the transmit portion to include microphone 350 which supplies electrical signals to modulator 356. As mentioned hereinabove, modulator 356 is of a construction specific to the transmission mode in which the radiotelephone is to be operated. Oscillator 362 supplies an oscillating signal to modulator 356; a signal generated by modulator 356 is supplied to mixer 368. Mixer 368 mixes the signal supplied thereto by modulator 356 with an oscillating signal, and generates a mixed signal which is supplied, in turn, to filter 372, exciter 378, amplifier 382, directional coupler 386, and filter 392. Filters 392 and 212 may together form a duplexer.

Output power of a signal generated by radiotelephone 200 is controlled by power control unit 396 which is provided input signals generated by RF detector 400 on line 404. While not shown, control signals may additionally be applied to detector 400 and/or power control unit 396.

Figure 3:
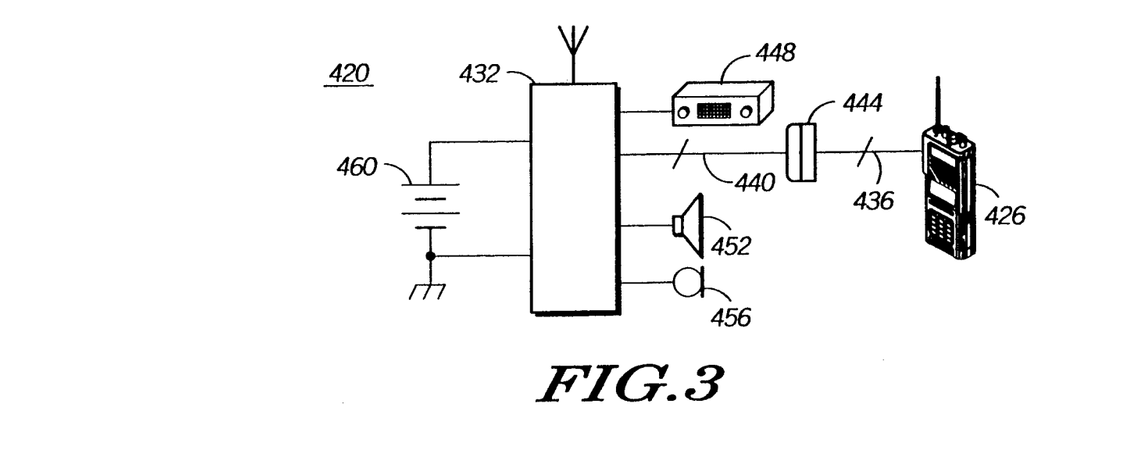
FIG. 3 is a partial schematic, partial block diagram of two radiotelephones intercoupled according to the teachings of the present invention.

Turning now to the partial schematic, partial block diagram of FIG. 3, two radiotelephones are intercoupled theretogether to form a radiotelephone-pair, referred to by reference numeral 420. By suitably intercoupling two radiotelephones theretogether, a data set forming a code (i.e., the access code mentioned hereinabove) contained in one of the radiotelephones which, when transmitted to a base station permits formation of a communication link therebetween, may be transferred to the other radiotelephone of the radiotelephone-pair 420. Therefore, radiotelephone-pair 420 is formed of first radiotelephone 426, here a portable radiotelephone similar to portable radiotelephone 166 of FIG. 1, and second radiotelephone 432, here a mobile radiotelephone similar to mobile radiotelephone 172 of FIG. 1. Line 436, extending from radiotelephone 426, and line 440, extending from radiotelephone 432, are coupled theretogether by connectors 444.

FIG. 3 further illustrates peripheral devices coupled to radiotelephone 432 such as handset 448, speaker 452, and microphone 456. Power supply 460 is coupled to radiotelephone 432 to power the radiotelephone thereby. In a preferred embodiment of the present invention, when radiotelephone 426 is intercoupled with radiotelephone 432 by connectors 444, suitable connections are made between power supply 460 and radiotelephone 426 to permit radiotelephone 426 to be powered by battery supply 460.

The data set forming the code contained in one of the radiotelephones may be contained in either first radiotelephone 426 or second radiotelephone 432, or in both first radiotelephone 426 and second radiotelephone 432. When the data set forming the code is contained in both first radiotelephone 426 and second radiotelephone 432, the radiotelephones 426 and 432 may be separately operated with no connection therebetween. Intercoupling of the first and second radiotelephones 426 and 432 according to the present invention may be still advantageously utilized even when data sets forming distinct codes are contained in both radiotelephones 426 and 432. For example, the data set forming the code contained in one of the radiotelephones may be transferred to the other of the radiotelephones to form the communication link with the communication network for purposes of billing the resultant transmission to one or an other billing account defined according to the data set forming the code.

The data set forming the code, which, when transmitted permits formation of the communication link between the communication network and the radiotelephone, is preferably, as is conventional, comprised of number assignment module (NAM) data. NAM data includes, for example, data sequences forming phone numbers, system identification numbers, system channel scan data, and radiotelephone serial numbers.

Intercoupling of two radiotelephones to permit transfer of the data set therebetween is particularly advantageous for the reason that a radiotelephone of conventional design may be intercoupled with a radiotelephone of a design permitting formation of modulated, information signals necessary for advantageous utilization of the features of a cellular, communication system of increased capacity. With reference to FIG. 3, for example, first radiotelephone 426 may be comprised of a portable radiotelephone of conventional construction, and the data set may be contained within radiotelephone 426. Second radiotelephone 432 may be comprised of a mobile radiotelephone of a construction permitting transmission of information signals capable of such advantageous utilization of a cellular, communication system of increased capacity. When a user desires to transmit information in a transmission mode capable of utilizing the increased transmission capacity of a cellular, communication system of increased capacity, the portable radiotelephone is intercoupled, as shown, with mobile radiotelephone 432, the data set contained within radiotelephone 426 is transferred to mobile radiotelephone 432 from radiotelephone 426, and the communication link with the communication network is formed by transmission of the data set from radiotelephone 432 to a base station of the communication network.

As previously mentioned, a cellular communication system may be utilized at full capacity during only certain portions of the day, such as during morning and evening rush hour periods. The portable radiotelephone 426 may be independently operated during most of the day, and intercoupled with mobile radiotelephone 432 during those periods of the day in which the cellular communication system is fully utilized to make use of the additional capacity of a cellular, communication system for such increased capacity. Because the data set forming the code is contained in the portable radiotelephone 426, the portable radiotelephone is capable of independent operation during all hours. During rush hour periods in which utilization of the additional transmission capacity of a cellular, communication system may be necessary, the user may intercouple the portable radiotelephone 426 with the mobile radiotelephone 432. The data set contained within radiotelephone 426 may be transferred to mobile radiotelephone 432, and radiotelephone 432 may be utilized to form the communication link with the communication network.

Figure 4:
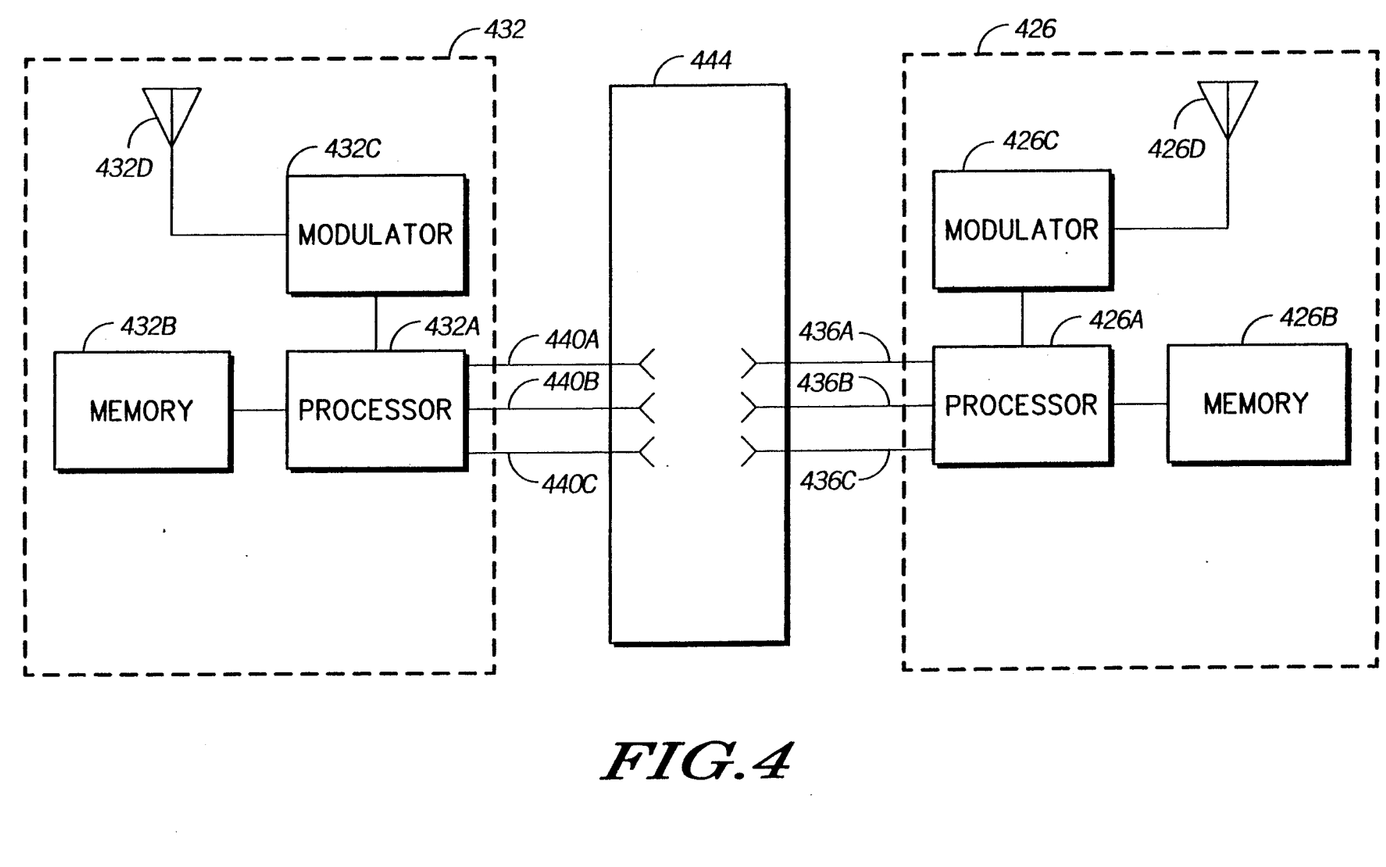
FIG. 4 is a block diagram showing in greater detail the intercoupling of the radiotelephones of FIG. 3 according to the present invention.

Turning now to the partial block, partial schematic illustration of FIG. 4, the intercoupling between portions of first radiotelephone 426 (indicated by the block shown in hatch at the right-hand side portion of the Figure) and second radiotelephone 432 (indicated by the block shown in hatch at the left-hand side portion of the Figure) of radiotelephone-pair 420 of FIG. 3 is shown in greater detail. Connector 444 couples data lines 436A, 436B, and 436C of radiotelephone 426 with corresponding data lines 440A, 440B, and 440C of radiotelephone 432. Preferably, connector 444 forms a plug connector formed of mated pin connectors disposed at ends of each of the data lines 436A-C and 440A-C. When suitably intercoupled theretogether, lines 436A-C and 440A-C form a bus interconnecting processor 426A of first radiotelephone 426 and processor 432A of second radiotelephone 432. The bus formed therefrom may be operative to transfer data according to the protocol disclosed in U.S. Pat. Nos. 4,369,516 and 4,654,655. The resultant line formed of lines 436A-440A may thereby form a "true" (T) line; the resultant line formed of lines 436B-440B may thereby form a "complement" (C) line; and the resultant line formed of lines 436C-440C may thereby form a "return" line (R). Alternatively a single line bus may be formed according to the protocol disclosed in U.S. Pat. No. 4,972,432 to Gregory P. Wilson et al.; such single line bus is referred to as a serial communications interface (SCI) bus, in which the single line, such as the above-defined R line, is utilized to transmit data to radiotelephone 426 from radiotelephone 432, and to transmit data to radiotelephone 432 from radiotelephone 426.

Memory element 426B is coupled to processor 426A, and memory element 432B is coupled to processor 432A. Memory elements 426B and 432B store algorithms which are executable by processors 426A and 432A, respectively, and at least one of elements 426B and 432B stores the data sequence forming a code, such as the aforementioned-NAM information, which, when transmitted to a base station, permits a communication link to be formed therewith. Further illustrated in the Figure are modulators 426C and 432C which are coupled to processors 426A and 432A, respectively. Modulators 426C and 432C generate modulated, information signals by a desired modulation technique which are emitted by antennas 426D and 432D over a desired transmission channel.

According to a preferred embodiment of the present invention, radiotelephone 426 comprises a portable radiotelephone of conventional construction (i.e., the radiotelephone generates an analog, frequency modulated signal of normal bandwidth according to a conventional frequency modulation technique, referred to hereinbelow simply by the term "analog" technique) and radiotelephone 432 comprises a mobile radiotelephone capable of generating modulated, information signals capable of utilizing the transmission capacity of a cellular, communication system of increased capacity.

Accordingly, modulator 432C generates a modulated signal according to a desired modulation technique, such as a discrete-modulation technique (e.g., a Time Division Multiple Access, TDMA, technique, or a Code Division Multiple Access, CDMA, technique), or a reduced-bandwidth analog modulation technique (referred to hereinbelow as an "analog split channel" technique). As radiotelephone constructions capable of generating such modulated, information signals typically are further capable of transmitting the analog, FM signals of conventional bandwidth (i.e., "analog"), such radiotelephone constructions are usually referred to as "dual-mode" radiotelephones. Radiotelephones may also be constructed to generate three different forms of modulated, information signals, referred to as "tri-mode" radiotelephones, as well as a plurality of different forms of modulated, information signals, referred to as "multi-mode" radiotelephones.

The following lists several of the many combinations of modulated, information signals which may be generated by radiotelephone circuitry of various radiotelephone constructions: analog; analog split channel; digital TDMA; digital CDMA; analog/analog split channel; analog/digital TDMA; analog/digital CDMA; analog/analog split channel/digital TDMA; analog-/analog split channel/digital CDMA; analog/digital TDMA/digital CDMA; analog split channel/digital TDMA; analog split channel/digital CDMA; analog split channel/digital TDMA/digital CDMA; and digital TDMA/digital CDMA. It is to be noted, of course, that such radiotelephone construction-combinations may similarly be embodied by a portable radiotelephone, and that radiotelephone constructions may be designed to generate other modulated, information signals, and dual-, tri-, and multi-mode radiotelephones of other combinations may be constructed. Therefore, while the above list is certainly not exhaustive, any of the above constructions may form radiotelephone 426 and/or 432 according to the present invention.

Additionally, intercoupling of radiotelephones 426 and 432 permits communication between the respective ones of the radiotelephones, and, hence, radiotelephone 426 may utilize the circuitry of radiotelephone 432 and vice versa. Preferably, communication between the two radiotelephones 426 and 432 includes transfer of data including signalling transfer such as: intersignalling between the radiotelephones to indicate times when the radiotelephones are intercoupled theretogether, transfer of program information including data set as well as repertory dial information, and other signalling transfer to permit one of the radiotelephones to utilize circuitry of the other radiotelephone. For example, signalling transfer between portable radiotelephone 426 and mobile radiotelephone 432 may permit the portable radiotelephone to utilize circuitry of the mobile radiotelephone 432 including mobile radiotelephone circuitry pertaining to transmitter power, receiver sensitivity, antenna characteristics, as well as speaker phone functions, diversity, speech synthesis, and voice recognition capability.

Figure 5:
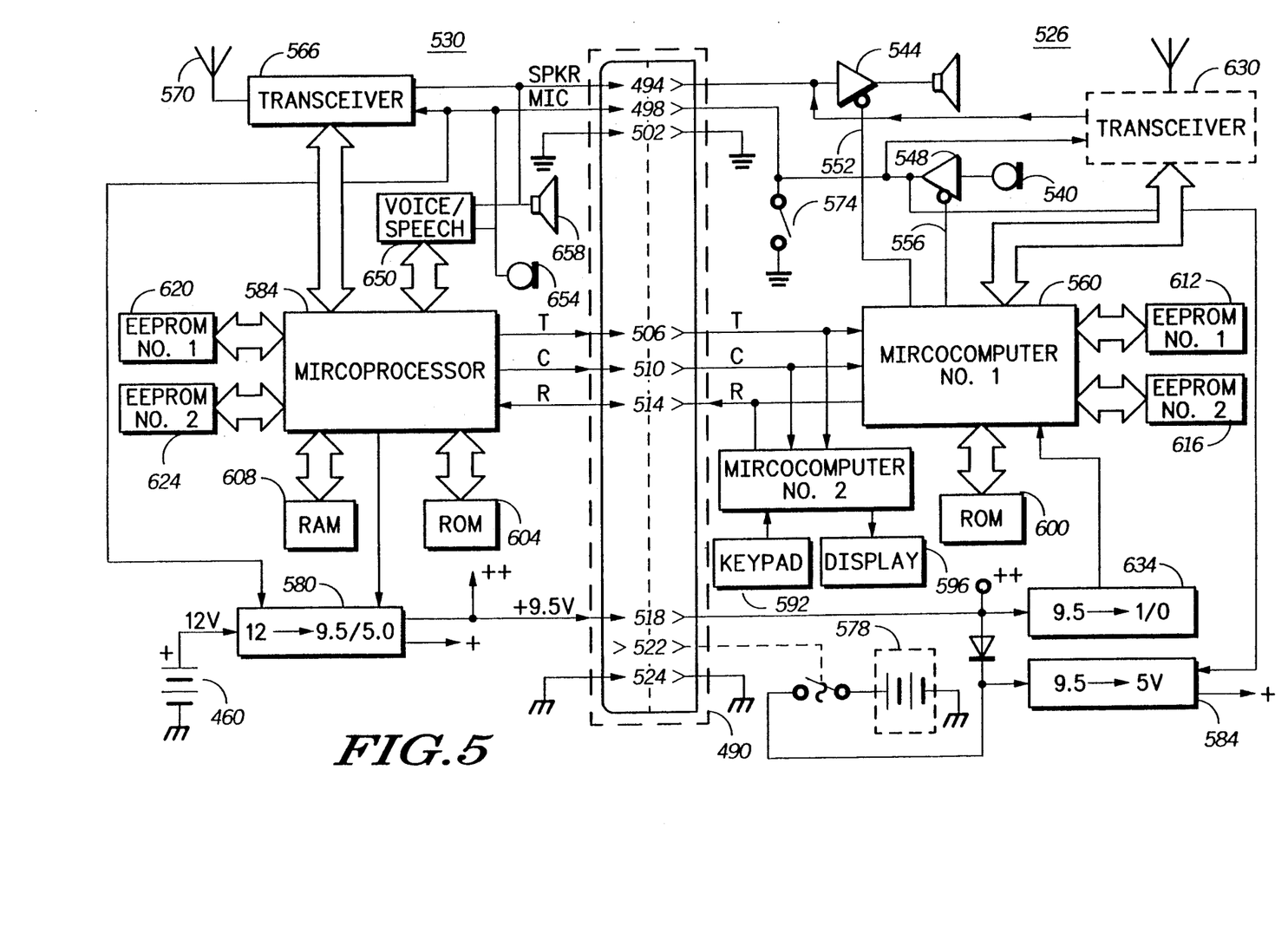
FIG. 5 is a partial block, partial circuit diagram illustrating the intercoupling between the radiotelephones of FIG. 3 according to a preferred embodiment of the present invention.

Turning now to the partial block, partial circuit schematic of FIG. 5, the intercoupling between a radiotelephone pair such as radiotelephone-pair 420 of FIG. 3 according to a preferred embodiment of the present invention is shown in greater detail. Connector 490, shown in hatch in FIG. 5 corresponds to connector 444 of FIG. 3. Connector 490 is a conventional plug-type connector which, in the preferred embodiment, comprises eight pin connections 494, 498, 502, 506, 510, 514, 518, and 524. The right-hand side portion of the figure illustrates selected portions of the circuitry of a first radiotelephone, referred to by reference number 526, of the radiotelephone-pair, and the left-hand side portion of the figure illustrates selected portions of the circuitry of a second radiotelephone, referred to generally by reference number 530, of the radiotelephone-pair.

In the following description, first radiotelephone 526 is a portable radiotelephone, and the second radiotelephone 530 is a mobile radiotelephone having circuitry permitting efficient transmission of information upon a cellular, communication system of increased capacity. It is to be noted, of course, that other combinations of portable and mobile radiotelephone-pairs are possible, and that the circuitry permitting most efficient transmission of information upon a cellular, communication system of increased capacity may, of course, be embodied within radiotelephone 526 rather than radiotelephone 530. Additionally, according to the following description of the preferred embodiment, the data sequence forming the code is contained within radiotelephone 526. The data sequence may, of course, be contained within radiotelephone 530 rather than radiotelephone 526, or, alternately, different data sequences forming the code may be contained within both radiotelephones 526 and 530.

Pin connection 494 indicates a speaker connection between the radiotelephone-pair 526-530. Pin connection 498 indicates a microphone connection between the radiotelephone-pair 526-530. Pin connection 502 indicates a ground connection between the radiotelephone-pair 526-530. Pin connections 506, 510 and 514 indicate a 3-wire data bus connection between radiotelephone-pair 526-530. Pin connection 518 indicates a common-power connection between the radiotelephone-pair 526-530, here indicated to be at a 9.5 volt potential difference above ground. Pin connection 524 also indicates a ground connection between radiotelephone-pair 526-530.

Pin connections 494, 498, and 502 form audio connections between radiotelephone 526 and 530 which permit, for example, when radiotelephone 526 comprises a portable radiotelephone, the portable radiotelephone to act as a handset of radiotelephone 530. As illustrated, radiotelephone 526 includes speaker 534 and microphone 540 which are connected to pin connections 494 and 498, respectively, through mute gates 544 and 548, respectively. Mute gates 544 and 548 are connected by lines 552 and 556, respectively, to microcomputer 560.

When radiotelephone 526 is suitably intercoupled with radiotelephone 530, speaker 534 and microphone 540 are connected to transceiver portion 566 of radiotelephone 530. Transceiver portion 566 generates a modulated, information signal which is emitted by antenna 570 to be received by a base station such as one of the base stations 112 of FIG. 1. Radiotelephone 526 of FIG. 5 further includes an on-off switch 574 which may be actuated by a user alternately to power, or to terminate power, to radiotelephone 526 by radiotelephone 530. When radiotelephone 526 is not intercoupled with radiotelephone 530, switch 574 is operative to power or to terminate the supply of power to radiotelephone 526 through an internal power supply 578 of the radiotelephone 526. Switch 574 may, for example, be comprised of a momentary switch operative to momentarily ground pin connection 498. Regulator 580 contained within radiotelephone 530 is enabled by switch 574 to power radiotelephone 530, and, by way of pin connection 518, also radiotelephone 526. Other switches, although not shown, may also be included in circuitry to activate regulator 580. One such switch configuration is described in U.S. Pat. No. 4,798,975 issued on Jan. 17, 1989, entitled "High Noise Immunity Input Level Detector with Hysteresis", assigned to assignee of the present invention, incorporated herein by reference.

Regulator 582 contained within radiotelephone 526 supplies the radiotelephone with power during intercoupling with radiotelephone 530. Pin connections 506, 510, and 514 permit transfer of data between the individual ones of radiotelephone-pair 526-530. In a preferred embodiment, the data bus formed thereby may utilize data transfer scheme such as those described in U.S. Pat. Nos. 4,369,516, and 4,654,655, the contents of which are incorporated herein by reference. Briefly, pin connection 506 interconnects the "T" lines of the three-wire bus, pin connection 510 interconnects the "C" lines of the three-wire bus and pin connection 514 interconnects the "R" line of the three-wire bus. The "T" and "C" lines are utilized to transmit data from microcomputer 584 of radiotelephone 530 to microcomputer 560 of radiotelephone 526. The "R" line is used to transmit data from microcomputer 560 of radiotelephone 526 to microcomputer 584 of radiotelephone of 530. Radiotelephone 526 further includes microcomputer 588 which, as illustrated, is also coupled to the "T", "C" and "R" of the data bus. Microcomputer 588 of radiotelephone 526 interfaces with keypad 592 and display element 596 of the radiotelephone. When suitably intercoupled, therefore, information entered by a user upon keypad 592 may be transferred to microcomputer 584 of radiotelephone 530 and to microcomputer 560 of radiotelephone 526.

The algorithms executed by microcomputer 560 of radiotelephone 526 are stored in memory 600, such as a read-only memory. Similarly, the algorithms executed by microcomputer 584 of radiotelephone 530 are stored in memories 604 and 608 which, as indicated, may be comprised of read-only memory and random access memory, respectively. Microcomputer 560 is additionally coupled to memory elements 612 and 616 which, preferably comprised EEPROM memories, and microcomputer 584 is additionally coupled to memory elements 620 and 624, also formed of EEPROM memories. In the preferred embodiment of the present invention, the data sequences forming the codes (which, when transmitted to a base station form the communication link therewith) are stored in memory elements 612, 616, 620 and/or 624. As noted previously, such data includes NAM information, may for example, be contained in memory elements 612 and 620, and the associated repertory dialing information may be stored in memory element 616 and 624. Microcomputers 560, 584, and 588 are preferably comprised of Motorola Microprocessors, Model Nos. MC68HC11.

As noted hereinabove, radiotelephone 526 according to the preferred embodiment of the present invention comprises a portable radiotelephone 526, and radiotelephone 530 comprises a mobile radiotelephone.

Differences between the mobile and the portable are, at times, significant. One difference is that the mobile includes a specially designated RAM 608. The RAM 608 is used, in response to a request from the microcomputer 584 over the data transfer bus formed by pin connections 506, 510 and 514 for storing the portable's NAM information which is downloaded from EE- PROM 612 of the portable. Such a data transfer allows the mobile to assume the portable's identity for subsequent communication on the system.

The mobile also accomodates downloading of the portable's repertory dialing information from EEPROM 616. This is accomplished by providing that the mobile's EEPROM 624 is not only used for storing the mobile's repertory dialing information, but also used, in response to a request from the microcomputer 584 over the data transfer bus (506, 510, and 514), for storing the portable's repertory dialing information which is downloaded from EEPROM 616 of the portable. Preferably, the EEPROM 624 is portioned into individual memory blocks, each of which is dedicated to the particular radio's repertory information according to the radio's associated unique phone number.

An alternative method for the mobile to access the portable's repertory dialing information in EEPROM 616 is for the portable to transfer only the dialing information that is selected at the portable. This would minimize the amount of data to be transferred in situations where the user only requires the mobile for limited usage. For example, consider a situation where the user desires to have the mobile assume the portable's identity for a single phone call. Once the intercoupling is established, the user selects a particular repertory dialing key on the portable (or corresponding key on the mobile). In response, the portable transfers the necessary dialing information to the mobile for transmission via the mobile's transceiver. When the call is complete, the user removes the portable for independent usage.

According to the present invention, by allowing the mobile to employ the portables' NAM and repertory dialing information, the user may employ the mobile as though it were the portable, thus, maintaining the same telephone number and repertory dialing information while preventing simultaneous radio usage of the same phone number.

Another difference between the portable and the mobile is that the transceiver 630, conventional to any portable, may be disabled in response to the microcomputer 560 detecting the availability and selection of the more powerful mobile transceiver 566. The detection is accomplished by the microcomputer 560 monitoring the 9.5 V connection 518 through a line conditioner circuit 634. The line conditioner 634 may be implemented using a bipolar transistor. Its function is to convert the 9.5 V signal to a binary signal to indicate whether or not the 9.5 V signal is present. The selection of the mobile transceiver 566 automatically occurs after the portable is intercoupled with the mobile and communication is established between the two radios. The selection to employ the mobile transceiver may also be manually implemented by providing for an user code, e.g., key sequence, which is programmed into the portable's keypad 592 to instruct the mobile to enable its transceiver accordingly.

A third difference involves the portable power supply. As previously discussed, the switch 574 on the portable actuates a voltage regulator 580 in the mobile to provide power to the portable during the intercoupling mode. Commensurate with this intercoupling, the power which is internal to the portable, battery 578 is disabled. This is accomplished through the use of a protrusion 638 on the connector. When the intercoupling is made, the protrusion 638 opens a switch 642 which disables internal power from being provided to the portable. While the portable is not intercoupled with the mobile, the switch 642 is normally closed. A diode 646 is connected between the battery 578 and the conditioner 634 to prevent the battery 578 from falsely indicating the presence of the 9.5 V from the mobile.

As previously discussed, one advantage of the radio intercoupling is that the portable is able to employ a number of mobile features which would not otherwise be available. The manner in which the portable employs the mobile's transceiver circuitry has been discussed above. A description of the manner in which the mobile's voice-speaker phone and voice recognition and speech synthesis circuitry follows.

The mobile's voice recognition and speech synthesis circuitry voice-speaker phone is depicted by block 650 of FIG. 5. After the radio intercoupling is established, the user enables the mobile's V/SP 650 by either entering a special key code into the portable's keypad 592 or by speaking a special command into the microphone 654.

Once the mobile's V/SP 650 is enabled, the user employs the speaker 658 and the microphone 654 as normal. The V/SP 650 decodes the speaker's verbal commands and provides the decoded information to the microcomputer 584, which information initiates data transfers to the transceiver 566 and to the portable's display 596.

The V/SP 650 may be implemented by using a conventional voice recognition/speech synthesis system. Although the V/SP 650 is shown communicating with the microcomputer via an independent connection, the data transfer bus (506, 510, and 514) may alternatively be employed.

The mobile's voice-speaker phone operation is utilized by entering a special key code into the portable's keypad 592. When the special key code is recognized by the microcomputer 584, the microcomputer 584 instructs the V/SP to enable the speaker 658 and the microphone 654 for the user's use. The speaker 658 and the microphone 654 are disabled either by a second special key code, by disconnecting the portable from the mobile or by lifting a separate handset 448 (connected to the mobile as shown in FIG. 3) offhook.

Figure 6:
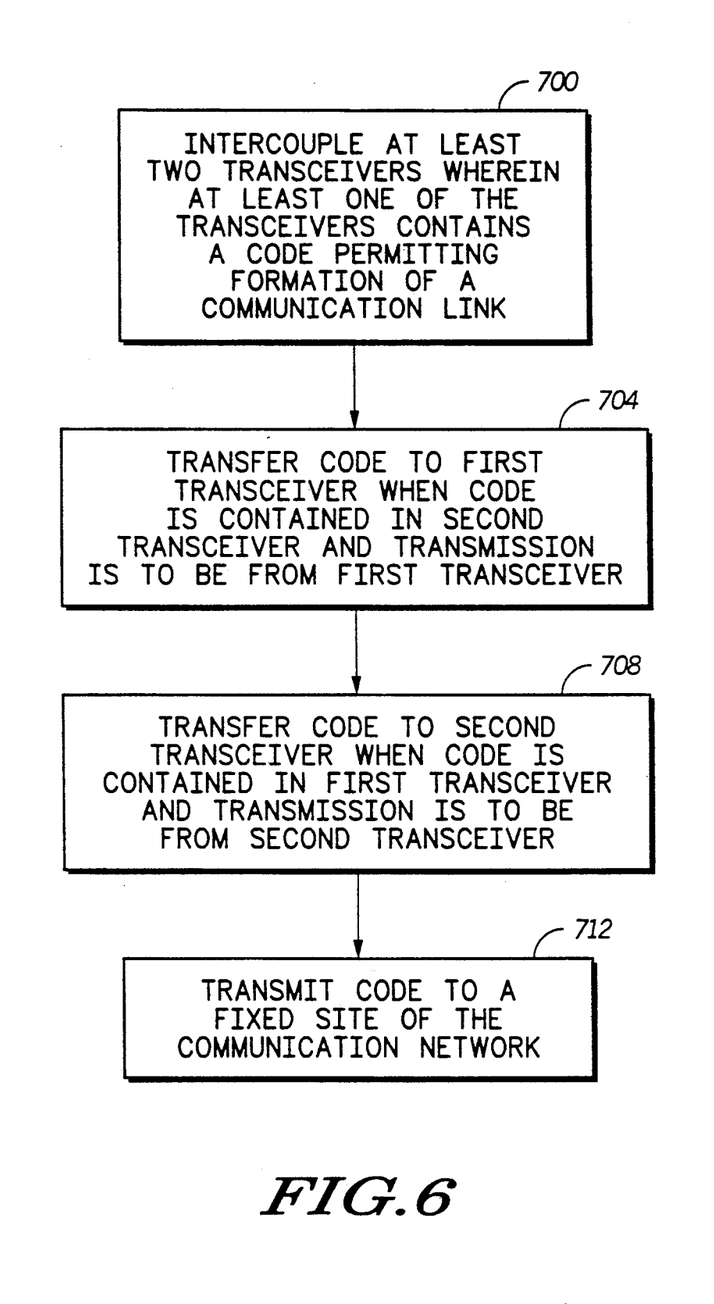
FIG. 6 is a flow diagram listing the method steps of the method of the present invention.

Turning now to the flow diagram of FIG. 6, the method steps of the method of the present invention are illustrated. First, and as indicated by block 700, at least two transceivers are intercoupled theretogether wherein at least one of the transceivers contain a code which, when transmitted to a fixed site of a communication network, permits a communication link to be created therewith. Next, and as indicated by block 704, the code is transferred to the first transceiver when the code is contained in the second receiver and an information signal is to be transmitted in the first transmission mode. Next, and as indicated by block 708, the code is transferred to the second transceiver when the code is contained in the first transceiver and an information signal is to be transmitted in a second transmission mode. Next, and as indicated by block 712, the code is transmitted to a fixed site of the communication network to permit formation thereby of a communication link between one of the at least two transceivers and the communication network.

In a preferred embodiment of the present invention, and as indicated by block 716, upon disconnecting the interconnected radiotelephones, the transferred code is erased in the accepter radio to prevent two radios from having the same code set on the system at the same time.

When, according to a preferred embodiment of the present invention illustrated in FIG. 5, radiotelephone 526 is comprised of a portable radiotelephone of conventional construction, and radiotelephone 530 is comprised of a mobile radiotelephone having circuitry to permit efficient transmission of information upon a cellular, communication system of increased capacity, intercoupling of the radiotelephones 526 and 530 theretogether permits transfer of the NAM information contained in memory elements 612 of radiotelephone 526 to microcomputer 584 of radiotelephone 530. Once transferred to microcomputer 584, such NAM information may be supplied to transceiver portion 566 whereat the NAM information is modulated according to a desired technique and supplied to antenna 570 to be transmitted therefrom. Because the NAM information need only be stored in radiotelephone 526, separate access fees required to provide unique NAM information to each of the radiotelephone 526 and 530 is not required. Utilization of the more efficient transmission of information according to a cellular, communication system is permitted of portable radiotelephone 526 when suitably intercoupled with mobile radiotelephone 530. Conversely, when radiotelephone 526 is not intercoupled with radiotelephone 530, radiotelephone 526 is also permitted to be operated to form a communication link with a cellular, communication system to transmit information signals therebetween.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A mixed-mode transceiver system operable on a communication network having at least one fixed site including receiver circuitry for receiving information signals modulated at least in a first transmission mode to form modulated signals of first modulation characteristics, and alternately, modulated in a second transmission mode to form modulated signals of a type having other than the first modulation characteristics, said transceiver system comprising:

at least two transceivers wherein a first transceiver of the at least two transceivers is operable to transmit to the at least one fixed site the information signals modulated in the first transmission mode to form the modulated signals of the first modulation characteristics and a second transceiver of the at least two transceivers is operable to transmit to the at least one fixed site the information signals modulated in the second transmission mode to form the modulated signals of the type having other than the first modulation characteristics, and wherein at least one of said first transceiver and said second transceiver of the at least two transceivers contains a code which, when modulated and transmitted to a fixed site of the at least one fixed site of the communication network, causes a communication link to be created therewith; and Plug connector means for intercoupling said first transceiver and said second transceiver to transfer said code from the first transceiver to the second transceiver when the code is contained in the first transceiver to modulate the code in the second transmission mode to form the modulated signals having other than the first modulation characteristics or from the second transceiver to the first transceiver when the code is contained in the second transceiver to modulate the code in the first transmission mode to form the modulated signals of the first modulation characteristics.

2. The mixed-mode transceiver system of claim 1 wherein the code contained by at least one of the first transceiver and the second transceiver is contained by both the first transceiver and the second transceiver.

3. The mixed-mode transceiver system of claim 1 wherein said code contained by at least one of the first transceiver and the second transceiver comprises a data set for uniquely identifying the first transceiver when the code is contained in the first transceiver and for uniquely identifying the second transceiver when the code is contained in the second transceiver.

4. The mixed-mode transceiver system of claim 3 wherein said data set comprises number assignment module data.

5. The mixed-mode transceiver system of claim 1 wherein said plug connector means for intercoupling comprises a bus interconnecting the first transceiver and the second transceiver.

6. The mixed-mode transceiver system of claim 5 wherein the bus interconnecting the first transceiver and the second transceiver comprises a three-line bus formed of a true, complement, and return line.

7. The mixed-mode transceiver system of claim 5 wherein the bus interconnecting the first transceiver and the second transceiver comprises a single-line, serial communications interface bus.

8. The mixed-mode transceiver system of claim 1 wherein said modulated signals of the first modulation characteristics comprise frequency-modulated signals of conventional bandwidths.

9. The mixed-mode transceiver system of claim 1 wherein said modulated signals having the other than the first modulation characteristics comprise modulated signals formed by a discrete-modulation technique.

10. The mixed-mode transceiver system of claim 1 wherein said modulated signals having the other than the first modulation characteristics comprise frequency-modulated signals of reduced bandwidths.

11. The mixed-mode transceiver system of claim 1 wherein said first transceiver of the at least two transceivers comprises a portable radiotelephone.

12. The mixed-mode transceiver system of claim 1 wherein said second transceiver of the at least two transceivers comprises a mobile radiotelephone.

13. The mixed-mode transceiver system of claim 1 wherein said second transceiver of the at least two transceivers is further operable to transmit to the at least one fixed site information signals modulated in a third transmission mode also to form the modulates signals having other than the first modulation characteristics.

14. The mixed-mode transceiver system of claim 1 further comprising means disposed within at least one of the first transceiver and the second transceiver for determining times when the plug connector means for intercoupling couples the first transceiver and the second transceiver theretogether.

15. A radiotelephone system operable on a cellular communication network having at least one fixed site including receiver circuitry for receiving information signals modulated at least in a first transmission mode to form modulated signals of first modulation characteristics, and alternately, modulated in a second transmission mode to form modulated signals of a type having other than the first modulation characteristics, said radiotelephone system comprising:

two radiotelephones wherein a first radiotelephone is operable to transmit to the at least one fixed site the information signals modulated to form the modulated signals of the first modulation characteristics and a second radiotelephone is operable to transmit to the at least one fixed site the information signals modulated to form the modulated signals of the type having other than the first modulation characteristics and wherein at least one of said first radiotelephone and said second radiotelephone contains a code which, when modulated and transmitted to a fixed site of the at least one fixed site of the communication network, causes a communication link to be created therewith; and     Plug connector means for intercoupling said first radiotelephone and said second radiotelephone to transfer said code provided to the cellular communication network from the first radiotelephone to the second radiotelephone or from the second radiotelephone to the first radiotelephone to transmit the code when modulated to form either the modulated signals of the first modulation characteristics of the modulated signals of the type having the other than the first modulation characteristics.

16. A radiotelephone-pair operable on a cellular communication network having at least one fixed site including receiver circuitry for receiving information signals modulated at least in a first transmission mode to form modulated signals of first modulation characteristics, and alternately, modulated in a second transmission mode to form modulated signals of a type having other than the first modulation characteristics, said radiotelephone-pair comprising:

a portable radiotelephone operable to transmit to the at least one fixed site information signals modulated to form the modulated signals of the first modulation characteristics;

a mobile radiotelephone operable to transmit to the at least one fixed site the information signals modulated in the second transmission mode to form the modulated signals of the type having other than the first modulation characteristics wherein at least one of said portable radiotelephone and said mobile radiotelephone contains a code which, when modulated and transmitted to a fixed site of the at least one fixed site of the communication network, causes a communication link to be created therewith; and     Plug connector means for intercoupling said portable radiotelephone and said mobile radiotelephone to transfer said code from the portable radiotelephone to the mobile radiotelephone to modulate the code in the second transmission mode to form the modulated signal having other than the first modulation characteristics or from the mobile radiotelephone to the portable radiotelephone to modulate the code in the first transmission mode to form the modulated signals having the first modulation characteristics.

17. A method for communicating with a communication network having at least one fixed site including receiver circuitry for receiving information signals modulated at least in a first transmission mode to form modulated signals of first modulation characteristics, and alternately, modulated in a second transmission mode to form modulated signals of a type having other than the first modulation characteristics, said method comprising the steps of:

intercoupling by a plug connector, at least two transceivers theretogether wherein a first of the at least two transceivers is operable to transmit to the at least one fixed site information signals modulated to form the modulated signals of the first modulation characteristics and a second transceiver is operable to transmit to the at least one fixed site information signals modulated to form the modulated signals of the type having other than the first modulation characteristics, and wherein at least one of said first transceiver and said second transceiver of the at least two transceivers contains a code which, when transmitted to a fixed site of the at least one fixed site of the communication network, permits a communication link to be created therewith;

transferring said code to the first transceiver when the code is contained in the second transceiver and said information signal is to be modulated to form the modulated signals of the first modulation characteristics;

transferring said code to the second transceiver when the code is contained in the first transceiver and said information signal is to be modulated to form the modulated signals of the type other than modulated signals of the first modulation characteristics; and     transmitting the code to a fixed site of the at least one fixed site of the communication network either by modulating the code to form the modulated signals of the first modulation characteristics or by modulating the code to form the modulated signals of the type other than the modulated signals of the first modulation characteristics to permit formation thereby of said communication link between one of the at least two transceivers and the at least one fixed site of the communication network.

18. The method of claim 17 wherein the first of the at least two transceivers intercoupled during said step of intercoupling comprises a portable radiotelephone.

19. The method of claim 17 wherein the second of the at least two transceivers intercoupled during said step of intercoupling comprises a mobile radiotelephone.

20. A radio arrangement for communicating on a radio system having a fixed site and a plurality of radio units, the arrangement comprising:

a first radio unit for transmitting information signals modulated to form modulated signals of first modulation characteristics and having at least one information set for establishing a radio frequency communication link between itself and the fixed site;

a second radio unit for transmitting information signals modulated to form modulated signals of a type having other than the first modulation characteristics and having a second information set for establishing a radio frequency communication link between itself and the fixed site; and     intercoupling plug connector means for intercoupling said first and second radio units and for allowing said first and second radio units to transfer a code therebetween, which code designates said first information set to be used by said second radio unit for communication with the fixed site during said intercoupling.

21. A radio arrangement for communicating on a radio system having a fixed site and a plurality of radio units, the arrangement comprising:

a first radio unit having a first transceiver for transmitting information signals modulated to form modulated signals of first modulation characteristics for enabling radio communication with the fixed site;

a second radio unit having a second radio transceiver for transmitting information signals modulated to form modulated signals of a type other than the modulated signals of the first modulation characteristics for enabling radio communications with the fixed site; and intercoupling plug connector means for intercoupling said first radio unit to said second radio unit such that said first radio unit employs said second transceiver for radio communications with the fixed site during said intercoupling.

* * * * *